F. D. ZELL, Jr.
CONTROLLING DEVICE FOR ACCELERATORS.
APPLICATION FILED NOV. 20, 1916.
1,274,491.
Patented Aug. 6, 1918.
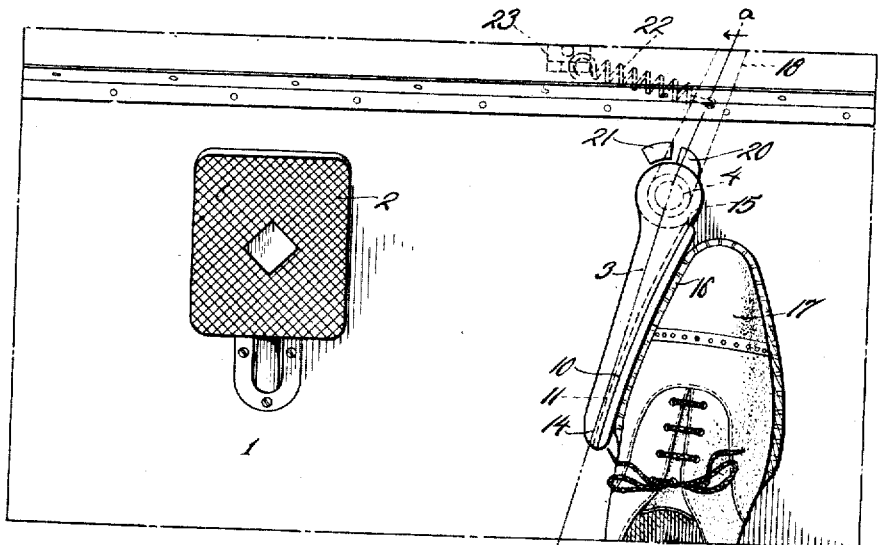
Fig. 1.
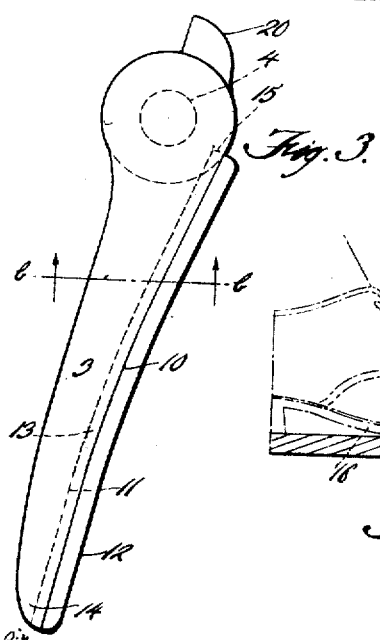
Fig. 3.
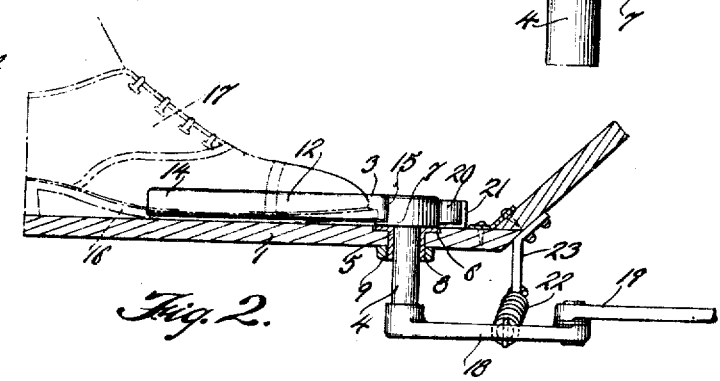
Fig. 4.
Fig. 2.
Witnesses
Inventor
Frank D. Zell Jr.
By Joshua R. H. Potts
His Attorney

UNITED STATES PATENT OFFICE.

FRANK D. ZELL, JR., OF PHILADELPHIA, PENNSYLVANIA.

CONTROLLING DEVICE FOR ACCELERATORS.

1,274,491.        Specification of Letters Patent.        Patented Aug. 6, 1918.

Application filed November 20, 1916. Serial No. 132,362.

*To all whom it may concern:*

Be it known that I, FRANK D. ZELL, Jr., a citizen of the United States, residing at Philadelphia, in the county of Philadelphia and State of Pennsylvania, have invented certain new and useful Improvements in Controlling Devices for Accelerators, of which the following is a specification.

My invention consists of an improved controlling device for accelerators, and is especially valuable on automobiles or other motor driven vehicles.

One object of my invention is to provide an accelerator including a lever which may be moved by the foot of the driver of an automobile, said movement being accomplished by a side movement of the foot rather than a vertical movement such as is necessary with most forms of accelerators now on the market.

With my improved invention, the driver of an automobile may keep his foot firmly on the floor at all times so that the movement of the accelerator controlling lever may be made accurately and therefore the jolt of the car will not interfere with the proper manipulation of the accelerator by the driver of the car.

Another object of my invention is to provide a specially constructed controlling lever for the accelerator, said lever having a wear member designed to be engaged by the foot of the driver.

A further object of my invention is to so construct said wear member that it may be securely held to the lever, but can also be removed when worn.

Another object of my invention is to so construct the above mentioned controlling lever that it may be readily operated without the foot of the operator being in any way attached or secured thereto so that the driver of an automobile having my invention thereon may have his feet free at all times. This latter is a particular advantage since in prior inventions flanged plates providing sockets have been employed requiring that the operator keep his foot on said plate and in engagement with the flanges providing the socket.

These objects, and other advantageous ends which will be described hereinafter, I attain in the following manner, reference being had to the accompanying drawings in which—

Figure 1 is a top plan view showing sufficient of the floor of an automobile to illustrate my invention.

Fig. 2 is a section on the line *a—a* of Fig. 1 showing my improved operating lever in outside view and the position of the foot of the operator in dot and dash lines.

Fig. 3 is an enlarged plan view of my improved controlling lever, and

Fig. 4 is a section on the line *b—b* of Fig. 3.

Referring to the drawing, 1 represents the floor of an automobile adjacent the driver's seat and 2 represents an ordinary pedal, such for example as used to operate the brake, and is merely shown to give the general position in which I locate my improved accelerator device.

My improved controlling lever 3 is positioned above the floor 1 and has a stem or shaft 4 which is preferably integral therewith and rotates within a bushing 5, the latter extending through the floor 1, as clearly shown in Fig. 2.

The bushing 5 has an annular flange 6 which forms a bearing for a hub 7 of the lever 3. The lower end of the bushing 5 is threaded as shown at 8, and a nut 9 is screwed onto this threaded end and securely holds said bushing to the floor 1. The lever 3 has its edge 10 provided with an undercut or dove-tail groove 11, said groove extending substantially throughout the entire length of said edge 10.

A wear member or strip 12 made of rubber or other material which will not injure the shoe of the driver, serves as a facing for the edge 10 of the lever 3, said facing having a dove-tailed extension or tongue 13 which fits within the groove 11. The facing 12 may be inserted in the lever 3 by sliding it in from the end 14.

A shoulder 15 is provided by the termination of the groove 11 in the lever 3, and the facing 12 is designed to abut said shoulder to prevent longitudinal creeping of said facing in one direction, within the groove 11.

The tongue or extension 13 may be normally made slightly larger than the groove 11 so as to be secured against accidental movement within said groove. Furthermore, the edge 10 is preferably curved inwardly throughout its length as clearly shown in Figs. 1 and 3 so as to conform to the sole 16 of the shoe 17 (see Fig. 1).

As shown in Fig. 2, an arm 18 is secured to the end of the stem 4 and this arm 18 in turn is pivotally connected to a link 19 which extends to the carbureter. The hub 7 of the lever 3 is provided with a projection 20 in the present instance, designed to engage a stop 21 mounted on the upper surface of the floor 1 when the lever 3 is in its normal position.

A spring 22 is preferably secured to the arm 18 and to a lug 23, which, for convenience, may be located on the lower surface of the floor 1, the action of the spring 22 being to hold said projection 20 in contact with the stop 21 and to return the lever 3 to its normal position when released by the foot of the driver.

The arm 18 is rigidly secured to the stem 4, so that a movement of the lever 3 in a horizontal plane will be transmitted to the arm 18, and consequently a movement of the arm 18 by the spring 22 will be transmitted to the lever 3 to return the latter to its normal position.

To actuate the accelerator, the driver of the automobile merely places his foot upon the floor in close proximity to the face 12 of the lever 3, and by a sliding or pivotal movement of his foot in a substantially horizontal plane, he engages and moves the lever 3. At no time is he required to move his foot from the floor so that no matter how much the car jolts, his control of the lever 3 is not affected nor is there any strain on the mounting of the lever 3, since the action of the foot of the driver is merely to rotate the stem 4.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:

A controlling device for accelerators including a flo forming a supporting structure, a contr lling lever pivotally mounted above said floor, said lever having an edge portion, said edge portion throughout its length being movable in a plane substantially parallel with the floor and operative by a side movement of the foot of an operator, a stop on said floor, a projection on said lever, and automatic means for moving and holding said projection in contact with said stop, substantially as described.

In testimony whereof I have signed my name to this specification in the presence of two subscribing witnesses.

FRANK D. ZELL, Jr.

Witnesses:
J. HARRY WAGNER,
F. D. LEE.